March 17, 1953 — J. D. McKEAN — 2,631,329

CASTER OF THE DISAPPEARING TYPE

Filed Aug. 26, 1950

JAMES D. MC KEAN
Inventor

By Smith & Tuck
Attorneys

Patented Mar. 17, 1953

2,631,329

UNITED STATES PATENT OFFICE 2,631,329

CASTER OF THE DISAPPEARING TYPE

James D. McKean, Seattle, Wash.

Application August 26, 1950, Serial No. 181,595

4 Claims. (Cl. 16—21)

My invention concerns a caster for an article of furniture or the like; and, more particularly, is a caster of the disappearing type. Briefly, the caster includes an upright cylindrical guideway to be positioned within the leg of the article to be supported; a circular traveller vertically reciprocal in the guideway between a lower and an upper position; an operating shaft running through the upper portion of the guideway; a toggle secured to the operating shaft and the traveller to raise and lower the traveller and lock it in its lower position; a circular turntable secured to the traveller in a manner permitting rotation of the same about a vertical axis; and a pair of fork arms having a wheel secured at one end and pivotally secured at the other end to the turntable, to swing about a horizontal axis, the latter ends of the fork arms being V-shaped to form stop limits for swinging movement of the fork arms.

It has long been recognized that it is desirable to have a caster of the disappearing type for furniture and like articles which are most easily moved on casters but which appear best and are most stable when the legs support the article directly by resting on the floor. Various attempts have been made to construct a desirable caster of this type. Some of these casters have been well designed for particular uses, but the present caster has many virtues over casters adapted for analogous uses. A principal problem in casters which retract into the leg of an article is caused by the fact that the caster, to properly function, must have the supporting arm of the wheel extend at an angle to the longitudinal axis of the leg with the wheel positioned at one side of that longitudinal axis. When the caster is drawn up in the furniture leg, the supporting arm and wheel must somehow be accommodated. A common solution is to make the leg large enough so that the arm and wheel may remain in the same relative position in regard to the longitudinal axis of the leg. Such a bulky leg is most objectionable in many types of articles.

A common problem in all casters is to provide a firm support for the supporting arm of the caster wheel while providing for swivelling rotation of the arm about a vertical axis. This problem has been attempted of solution in different ways with varying degrees of success. It is desirable that the support provide for rotation with a minimum of friction so that the wheels will swivel with ease in moving the furniture as well as for avoiding damage to the caster.

The objects of my invention include: providing a caster of the disappearing type in which the supporting arm for the wheel assumes a vertical position upon withdrawal whereby the furniture leg may have a minimum of bulk; designing a workable caster with a disappearing wheel of a large size; providing a caster of the disappearing type of improved construction for appearance, strength and workability and which is economical to manufacture; designing a caster with a firm support for the wheel and supporting arm while at the same time providing for rotation of the same with a minimum of friction; and to furnish a caster of the disappearing type with simple, efficient means of lowering and raising the wheel and firmly securing the wheel in its lower position.

My invention will best be understood from the following description when read with reference to the drawings, in which.

Figure 1:
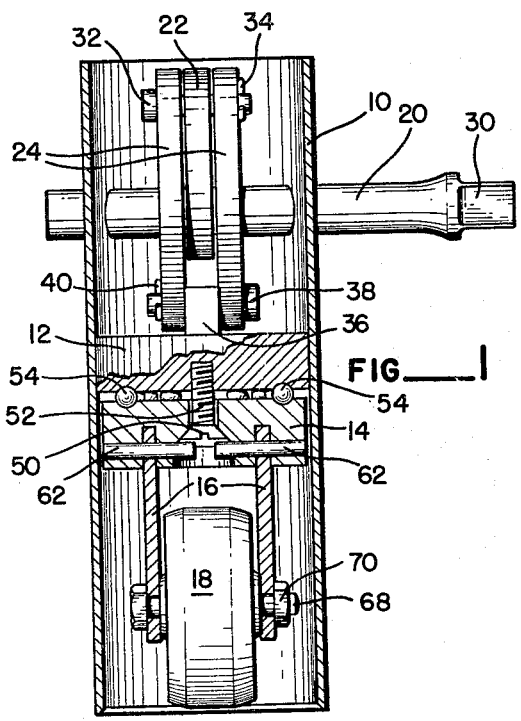
Figure 1 is an elevational view, partly in section, of a specific embodiment of my invention, in which the caster wheel is in an upper position.

The guideway 10 of my caster is preferably formed as an upright tube which, while shown cylindrical, may be of any suitable cross-section. Disposed to reciprocate in guideway 10 are traveller 12, turntable 14, a pair of fork arms 16, and wheel 18.

The reciprocating parts are activated by operating shaft 20, acting through a toggle formed by an upper toggle link 22 and a lower toggle link 24.

Guideway 10 may be of square or round cross-section. Guideway 10 may be positioned in the leg of a piece of furniture or the like, the installation being simple as only a longitudinal cylindrical bore is made to accommodate guideway 10 when the guideway is in the form of a cylinder. A transverse circular bore is made for operating shaft 20. The leg of the furniture does not have to be changed from symmetrical design to accommodate the caster. The lower edge of guideway 10 would be positioned near the lower end of the article leg which conceals the caster. Only one end of operating shaft 20, as at 30, has to extend outside of the furniture leg. In this way, an easily installed construction is provided which does not detract from the appearance of the supported article.

Figure 2:
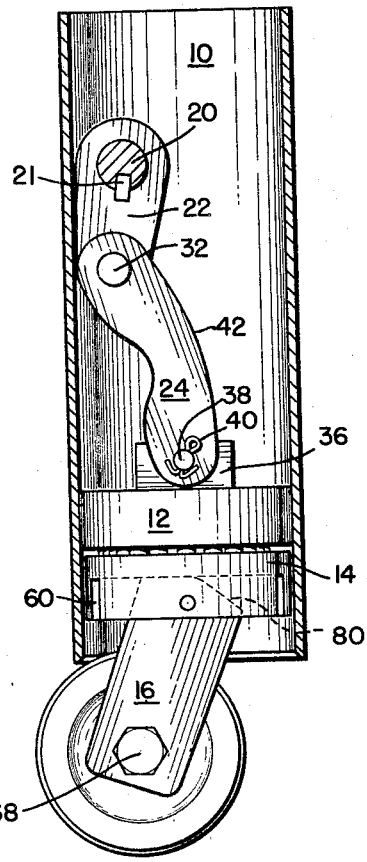
Figure 2 is an elevational view, partly in section, similar to Figure 1 except that the cutting plane is at right angles to the cutting plane in Figure 1 and the caster wheel is in a lower position.
Figure 3:
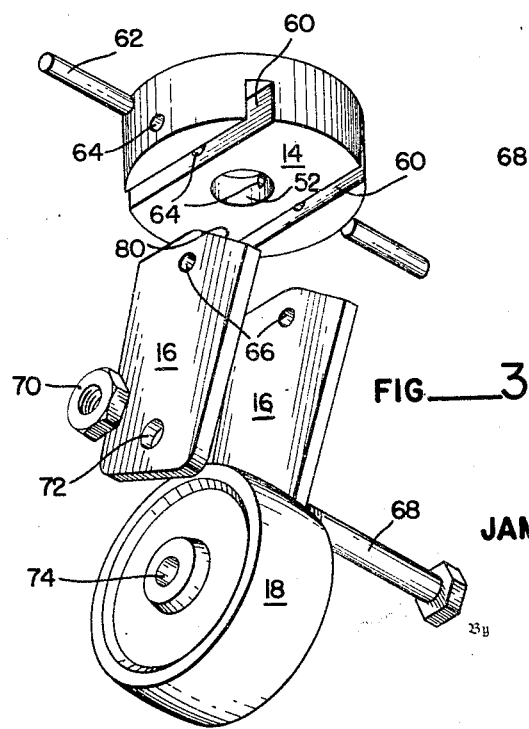
Figure 3 is an exploded view, on an enlarged scale, of the turntable, fork arms, wheel and associated parts.

The extending end of operating shaft 20 is squared, as at 30, or otherwise formed to accommodate a wrench or handle for operating the same. Upper toggle link 22 is fixedly secured to operating shaft 20 by means of a key 21, and joins with lower toggle link 24 as by bolt 32 and cotter pin 34. Lower toggle link 24 has preferably a pair of arms, positioned on either side of upper toggle link 22 and boss 36 on traveller 12. The arms of lower toggle link 24 are pivotally connected to boss 36 by bolt 38 and cotter pin 40. Operating shaft 20 is positioned at one side of the longitudinal axis of cylindrical guideway 10. As will be noted from Figure 2, lower toggle link 24 has a bend at 42 and connects at the center of traveller 12. With this positioning of the operating shaft, shape of the toggle links and point of connection with the traveller, the locking action shown in Figure 2 is obtained. The toggle abuts the wall of the guideway below operating shaft 20 in the locked position; and shaft 20, bolt 32, and bolt 40 must pass an aligned position in moving traveller 12 from a lower to an upper position. This construction provides firm locking of traveller 12 in its lower position and easy movement of traveller 12 from lower to upper position and back.

Turntable 14 is secured below traveller 12 by means permitting rotation of turntable 14 about a vertical axis. The means of securing shown in Figure 1 is screw 50 running through opening 52 in turntable 14 and threaded into traveller 12. Ball bearings 54 are positioned between turntable 14 and traveller 12 in circular races. The ball bearings provide for easy rotation of wheel 18 and arms 16 about a vertical axis; while, at the same time, wheel 18 is held stably in regard to shifting of its support. These are quite important factors as wheel 18 and arms 16 must be able to shift quickly as the article supported is moved in various directions and even if the article is quite heavy. One of the most frequent failures in casters is due to insufficient securing of the assembly about which the wheel arms rotate. With the circular turntable, reciprocal traveller, solid and rigid guideway, operating shaft, toggle and associated structure, turntable 14 turns easily and maintains its horizontal positioning thereby forming a stable support for fork arms 16 and wheel 18.

The construction of wheel 18, fork arms 16, and turntable 14, provides for retraction of wheel 18 in a position below turntable 14, an important feature of my invention. It will be noted that the diameter of wheel 18 is quite large in comparison with the diameter of guideway 10, which is possible with such positioning of wheel 18 in retracted position. Previous casters of the disappearing type lack this feature and either the guideway must be oversized in comparison with the desirable size for most furniture or other uses, or the wheel must be of small size, or the wheel must extend to the side of the guideway in its upper position.

Turntable 14 has two parallel slots 60 spaced equally on either side of opening 52. The upper ends of fork arms 16 are pivotally secured in slots 60 by pins 62 running through openings 64 in turntable 14 and openings 66 in fork arms 16. The lower ends of fork arms 16 are pivotally secured to wheel 18 by bolt 68 and nut 70 running through openings 72 in fork arms 16 and central opening 74 in wheel 18.

Limits on the swinging of fork arms 16 are provided by the abutting of portions of fork arms 16 against the bottom of slots 60. The abutting portions of fork arms 16, as at 80, are formed by beveling the ends of fork arms 16 on either side of the center. In supporting position, the coaction of the fork arms and turntable 14 forms a secure support for wheel 18 positioned to the side of the longitudinal axis of guideway 10. Upon movement of traveller 12 upwards, fork arms 16 assume a vertical position and wheel 18 is centered with guideway 10.

While I have described a specific embodiment of my invention, various modifications will be apparent to those skilled in the art and I wish to be understood as claiming all modifications within the scope of my invention.

I claim:

1. In a caster of the disappearing type, the combination, comprising: an upright cylindrical guideway to be positioned or included within the leg of the article to be supported; a circular traveller vertically reciprocal in said guideway between a lower and an upper position; an operating shaft running through the upper portion of said guideway and to one side of the center thereof; a toggle formed by an upper and a lower toggle link joined together with the free end of the upper link fixedly secured to said operating shaft and the free end of the lower link pivotally connected to said traveller, said traveller being locked in said lower position by the abutment of said toggle against the wall of said guideway beneath said operating shaft in extended position, said toggle links passing an aligned position when activated by said operating shaft to move said traveller from said lower to said upper position; a circular turntable; means of securing said traveller and said turntable together at their centers permitting rotation of said turntable about a vertical axis; ball bearings between said traveller and said turntable, said traveller and said turntable having circular races in their opposed faces in which said ball bearings are positioned; a wheel; a pair of fork arms secured at one end to said wheel; said turntable having two parallel slots spaced an equal distance from the center of said turntable on either side thereof; the other end of said pair of fork arms being pivotally secured in said slots, said fork arms being so shaped as to abut the bottom of said slots when the fork arms are disposed at a predetermined angle to said turntable, thereby forming limits on the swinging movement of said fork arms.

2. In a caster of the disappearing type, the combination, comprising: an upright cylindrical guideway adapted to be positioned within the leg of the article to be supported; a circular traveller vertically reciprocal in said guideway between a lower and an upper position; an operating shaft running through the upper portion of said guideway; a toggle mechanism having a first link which is fixedly secured at one end to said operating shaft and having a second link which is pivotally connected at one end to said traveller and at the other end to the other end of said first link, said traveller being locked in said lower position by the abutment of said toggle against the wall of said guideway, said operating shaft being rotatable to move said toggle from abutment with said wall for unlocking said traveller and for moving said traveller to said upper position; a circular turntable secured to said traveller in a manner permitting rotation of said turntable about a vertical axis; a wheel; a pair of fork arms secured at one end to said wheel and pivotally secured at the other end to said turntable at the center thereof to swing about a horizontal axis; said fork arms and said turntable having abutting surfaces providing stop limits for swinging movement of said fork arms about said horizontal axis and said wheel having a diameter almost as large as the diameter of the inner walls of said guideway.

3. In a caster of the disappearing type, the combination, comprising: an upright cylindrical guideway to be positioned or included within the leg of the article to be supported; a circular traveller vertically reciprocal in said guideway between a lower and an upper position; a circular turntable; means securing said traveller and said turntable together at their centers permitting rotation of said turntable about a vertical axis; ball bearings between said traveller and said turntable, said traveller and said turntable having circular races in their opposed faces in which said ball bearings are positioned; a wheel; a pair of fork arms secured at one end to said wheel; said turntable having two parallel slots spaced an equal distance from the center of said turntable on either side thereof; the other end of said pair of fork arms being pivotally secured in said slot, said fork arms being so shaped as to abut the bottom of said slots when said fork arms are disposed at a predetermined angle to said turntable, thereby forming limits on the swinging movement of said fork arms; and means for locking said traveller in said lower position.

4. In a caster of the disappearing type, the combination, comprising: an upright cylindrical guideway adapted to be positioned within the leg of the article to be supported; a circular traveller vertically reciprocal in said guideway between a lower and an upper position; an operating shaft running transversely through the upper portion of said guideway; a toggle mechanism having a first link which is fixedly secured at one end to said operating shaft and having a second link which is pivotally connected at one end to said traveller and at the other end to the other end of said first link, said traveller being locked in said lower position by the abutment of said toggle against the wall of said guideway, said operating shaft being rotatable to move said toggle from abutment with said wall for unlocking said traveller and for moving said traveller to said upper position; a turntable secured to said traveller in a manner permitting rotation of said turntable about a vertical axis; a wheel; and a supporting member for said wheel secured to said turntable at one end and rotatably supporting said wheel at the other end.

JAMES D. McKEAN.

REFERENCES CITED

The following references are of record in the file of this patent:

UNITED STATES PATENTS

| Number | Name | Date |
| --- | --- | --- |
| 30,505 | Stafford | Oct. 23, 1860 |
| 952,694 | Ward | Mar. 22, 1910 |
| 937,064 | Grotenhuis | Mar. 14, 1911 |
| 1,016,745 | Henrikson | Feb. 6, 1912 |
| 1,022,646 | Toll | Apr. 9, 1912 |